Dec. 27, 1932.  G. RAUSCH  1,892,251
AUTOMATIC DOUGH DIVIDING AND ROLLING MACHINE
Filed Feb. 26, 1931  3 Sheets-Sheet 1
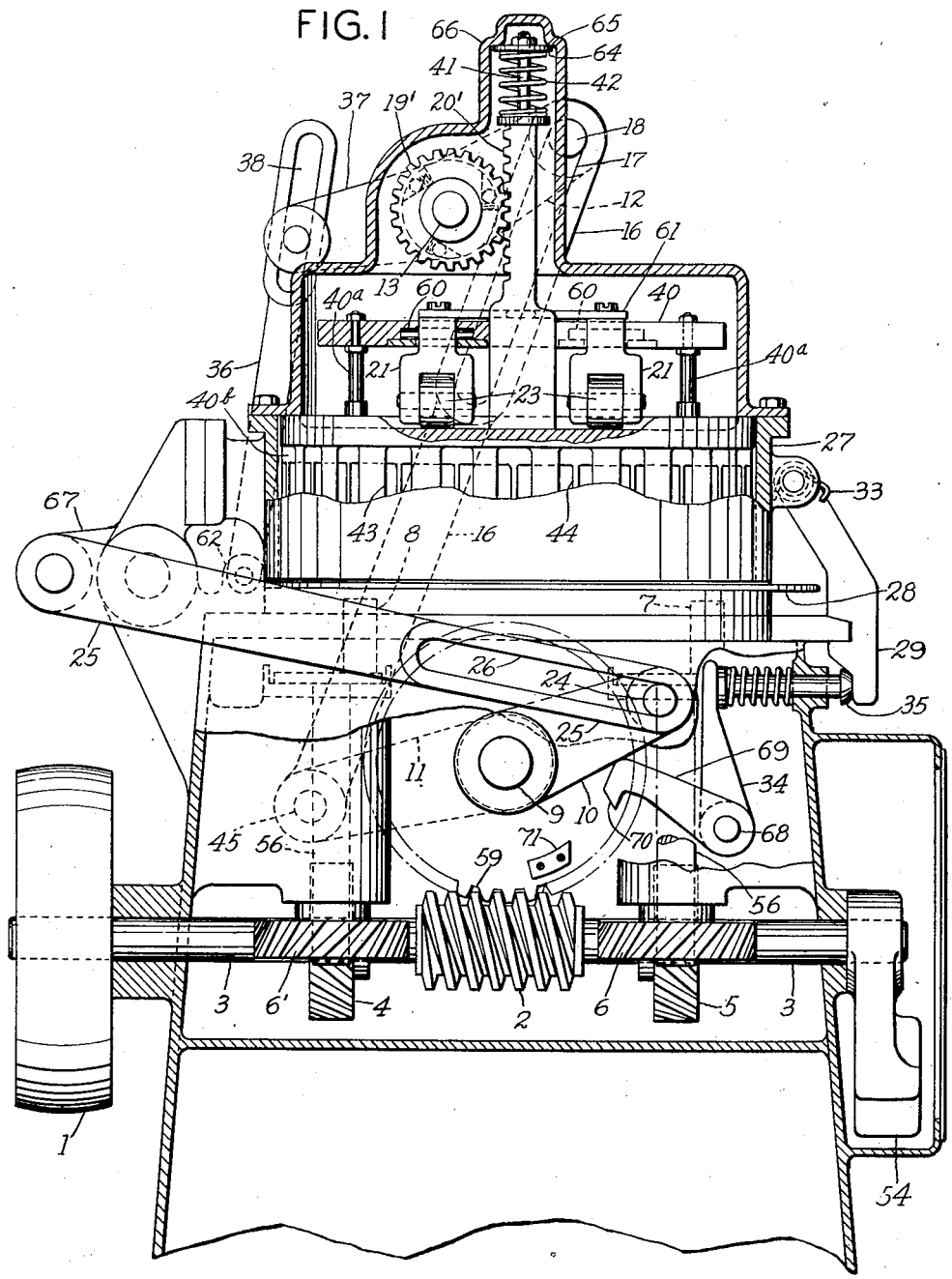
INVENTOR
Gottfried Rausch
BY
Sydney Prescott
ATTORNEY

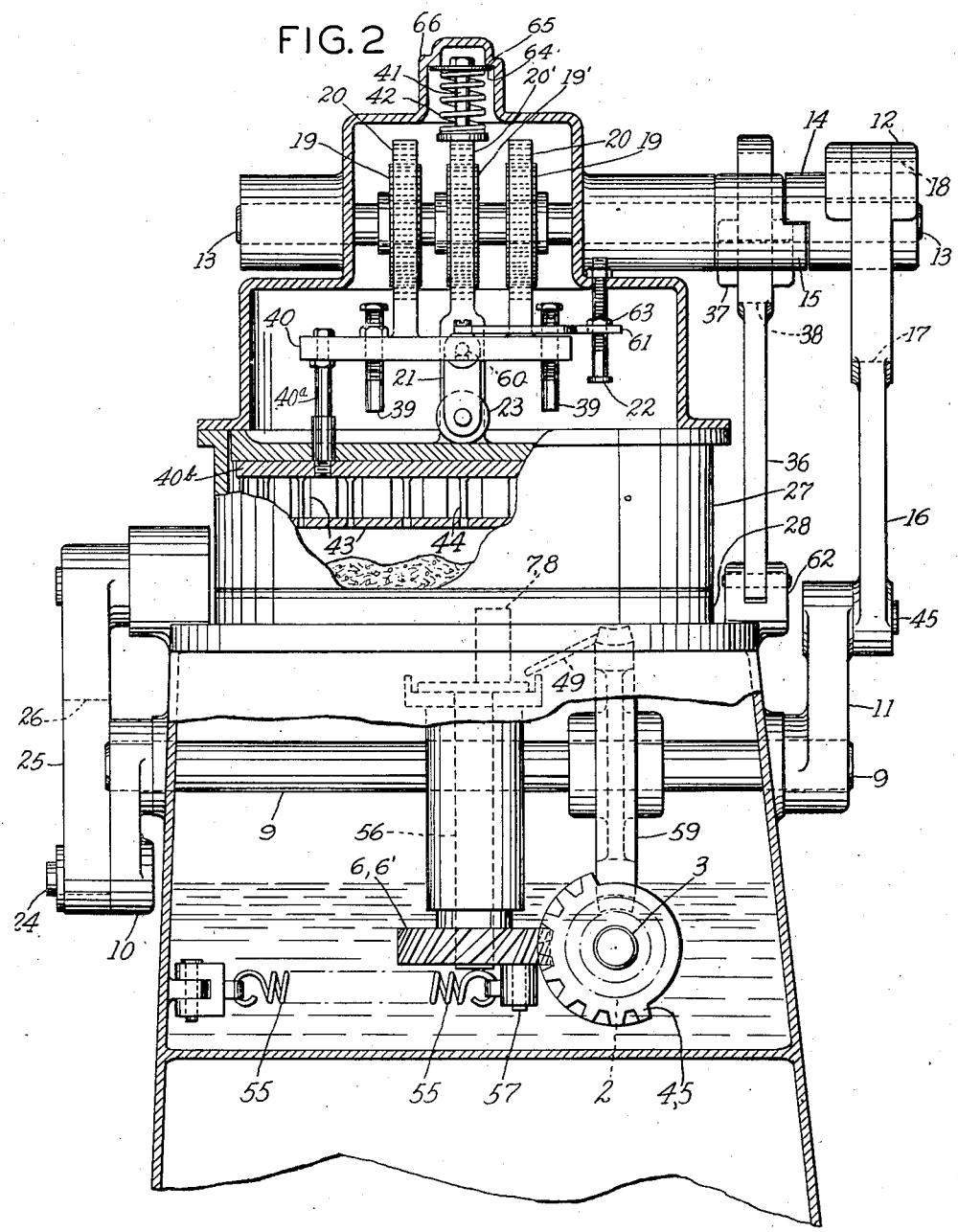

Dec. 27, 1932. G. RAUSCH 1,892,251
AUTOMATIC DOUGH DIVIDING AND ROLLING MACHINE
Filed Feb. 26, 1931 3 Sheets-Sheet 3
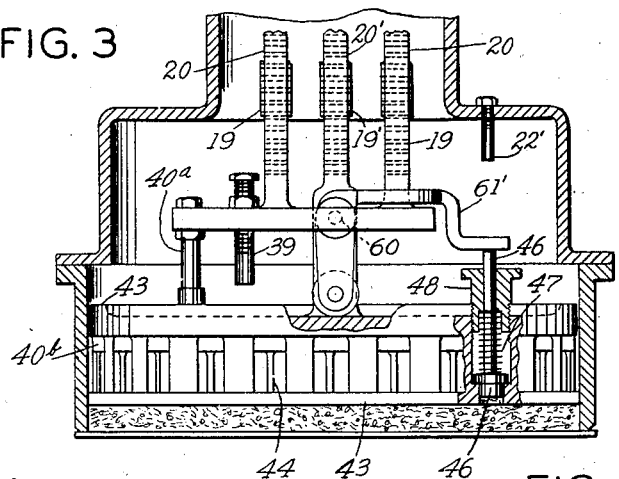
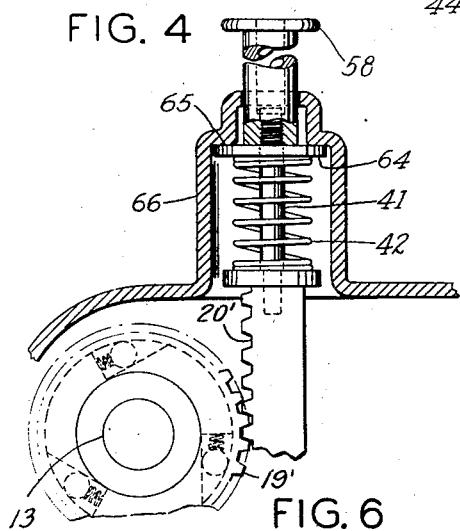
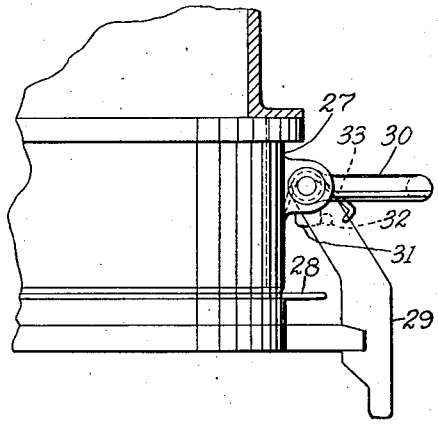
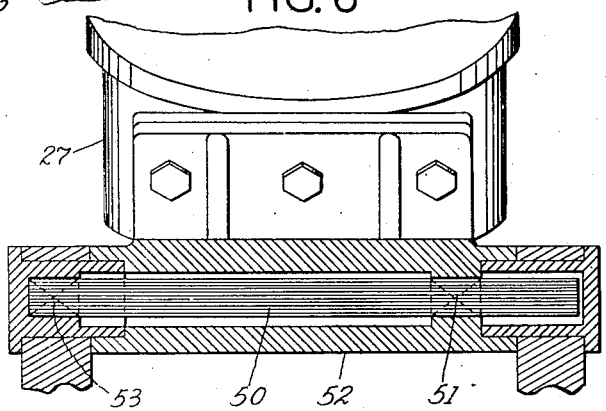
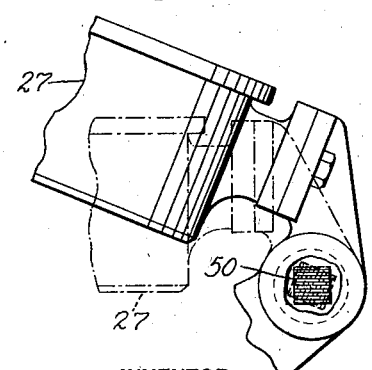
INVENTOR
Gottfried Rausch
BY
Sydney Prescott
ATTORNEY Patented Dec. 27, 1932

1,892,251

UNITED STATES PATENT OFFICE

GOTTFRIED RAUSCH, OF AMENDORF NEAR HALLE-ON-THE-SAALE, GERMANY

AUTOMATIC DOUGH DIVIDING AND ROLLING MACHINE

Application filed February 26, 1931, Serial No. 518,356, and in Germany March 1, 1930.

This invention relates to dough dividing and rolling machines particularly to fully automatic machines of this type. Former machines of this kind are complicated and because they require curved guidings or cam surfaces for the operation of certain parts, are comparatively expensive in their manufacture, since cam surfaces require accurate and good workmanship if the machine is not to be subject to such rapid wear as to be useless in an unduly short time.

The present invention avoids the usual disadvantages of these automatic machines mainly by employing, for the operation of all motions, simple drives, especially such as are derived from the link parallelogram and from the sliding link crank drive. These drives can be produced comparatively simply, cheaply and accurately without fear of rapid wear. In the employment of such drives for star knife type dough dividing and rolling machines, however, difficulties are encountered by reason of the fact that, according to their nature, these drives produce uniform motions, while the motions for the operations of dough dividing and rolling machines, such as the opening and closing of the press form and the pressing and cutting of the dough, must be performed in the shortest possible time and rests between motions must occur of considerable length.

In order to perform such highly intermittent operation by the above simple and dependable devices, that is by means of cranks, connecting rods, swinging arms and the like, certain of the drive parts are in the present invention provided with slots in which operate the connecting pins of the moving parts, to which in some instances are added connections between the transmission shafts and their drives or connecting rods which permit motion in one direction only.

For the unlocking of the press plate from the knives, the locking member, upon engagement with an adjustable stop or upon imparting of motion by a part controlled by the press plate pressure, is released by the press or cutting pressure itself. By this arrangement, the pressing and cutting of the dough can be performed by the same shaft and even by the same drive, thereby greatly simplifying the machine.

The drive gear of the machine is placed between those gears on the main shaft which transmit motion to the dough rolling parts, so that the entire drive can be placed in an oil housing in the pedestal of the machine, thereby obtaining a very compact construction requiring little floor space.

Furthermore, the lubrication of all driving parts is accomplished by leading the oil carried up by the drive wheels to the upper bearings by suitable piping or oil channels so arranged as to eliminate all danger of having the oil come in contact with the dough to be worked. In spite of the disposal of the entire drive in the pedestal of the machine, there is room for mounting of the drive motor, thereby effecting a still further saving in floor space and preventing damage to the motor by dust, etc. With these and other objects not specifically mentioned in view, the invention consists in certain constructions and combinations which will be hereinafter fully described and then specifically set forth in the claims hereunto appended.

One of the many possible constructions which may be employed in carrying this invention into practice is shown in the accompanying drawings which form a part of this specification and in which like characters of reference indicate the same or like parts and in which, Fig. 1 is a side elevation, partly in cross section, of the improved automatic dough dividing and rolling machine; Fig. 2 is a front elevation of the machine shown in Fig. 1; Fig. 3 is a sectional front elevation of the press head showing a modification of the actuating device between the press plate and the dough cutting knives, the press head being in its downward position with the dough compressed for cutting; Fig. 4 is a sectional elevation showing a modified device for determining the height of the dough rolling chamber; Fig. 5 is a fragmentary side elevation showing a hand locking arrangement for the press head; Figs. 6 and 7 are detail elevations showing the construction and operation of a torsion spring for balancing the weight of the press head.

In carrying the invention into effect there is provided in a dough dividing and rolling machine, a press plate and dividing knives for compressing and dividing the dough, together with mechanism including a rotating crank and lost motion linkage for operating said press plate and dividing knives intermittently in predetermined timed relation. In the best constructions said lost motion linkage includes a link having a slot and pin connection for intermittently transmitting motion to said press plate and dividing knives. In the best constructions said mechanism further includes rotatable means for operating the press plate and dividing knives, an oscillating arm driving said rotatable means, and a one way clutch between said arm and said means. Preferably said mechanism includes a lever extending perpendicularly between said plate and knives and operating to move one as result of movement of the other, together with means for swinging said lever out of perpendicular at a predetermined point in their movement to permit one to move thereafter independently of the other. The various means referred to may be varied widely in construction within the scope of the claims for the particular device selected to illustrate the invention is but one of many possible concrete embodiments of the same. The invention therefore is not to be restricted to the precise details of the structure shown and described.

Referring to Figs 1 and 2, the machine is driven by a motor or by a pulley 1 which, through a clutch not shown, actuates a worm 2 mounted on the main shaft 3 which is journaled in the pedestal of the machine and also has the mutilated spiral gears 4 and 5 for intermittently driving, through spiral gears 6 and 6', the eccentric vertical rolling cranks 7 and 8 respectively, which impart intermittent rotary rounding motion to the dough supporting plate 28. Of course other means for imparting intermittent rotary rounding motion to the dough supporting plate, such as a cam-operated clutch as disclosed in my Patent No. 1,851,328 granted Mar. 29, 1932, may be employed.

The worm 2, by means of a worm wheel 59, drives the actuating shaft 9, which in one revolution produces all motions necessary for one cycle of the machine: locking, pressing, cutting and opening. For this purpose, the shaft 9 carries a crank 10 for opening and closing of the press form and a crank 11 for pressing and cutting of the dough. The transmission of the motion from cranks 10 and 11 is effected by connecting rods 25 and 16 provided with cam slots so designed as to produce sufficient lost motion to cause quick intermittent motion of the respective parts and to provide sufficiently long intervals between the motions of these parts.

Thus, the connecting rod 16 for pressing and cutting, which is attached to crank 11 by the crank pin 45, has a slot 17 in which a stud 18 of the swinging arm 12 can move with the necessary idle motion without transmitting its movement to the pressing and cutting mechanism but, since such slot guides are in the present instance insufficient to provide the necessary rest interval and since other devices are employed for returning the press head and the dividing knives to their original position after completing their work, the swinging arm 12 is mounted loosely on shaft 13 and is coupled to it by means of claws 14 and 15 or similar coupling devices acting as a one way clutch in such manner as to turn the shaft 13 in the direction of the pressing and cutting motion only while permitting free movement of shaft 13 in the opposite direction by other means.

From the pressing and cutting shaft 13, the motion is transmitted to the press head 43 and the knives 44 by means of gears 19, 19, and 19' and racks 20, though other means such as levers may be employed. After the dough has been compressed to a sufficient degree, the cutting motion is started. For this purpose the knives which comprise a unit consisting of a knife cross or supporting and operating plate 40 having bolts 40a slidable through the press plate and carrying on a plate 40b the edged portions 44 of the knife structure, and the press head 43 are moved downward as one part, being locked together for travel in unison by a suitable device which is automatically unlocked or moved to inoperative position at the proper moment during their descent.

In order to quickly unlock the knife from the press plate at a definite point of the working cycle after conclusion of the pressing operation, in place of the usual sliding motion, a rolling motion is provided between the supporting surface of the locking levers 21 and the press head by means of rollers 23 at the supporting ends of lock levers 21. The lock levers 21 are pivoted in substantially perpendicular position between the cross 40 and plate 43, on pins 60 in the knife cross 40 on which they are turnable by means of a horizontal arm 61 engaging with an adjustable stop 22 attached to the housing of the machine. At the proper point in the descent of the locked knife cross and press plate, the arm 61 is arrested by stop 22, thereby turning the lock levers 21 out of perpendicular position and permitting the knife cross 40 to move towards the press head 43 so that the knives 44 now enter into the dough chamber and divide the compressed dough on plate 28. In this manner, an ever so short engagement of arm 61 with the stop 22 is sufficient to trip the vertical lock levers 21 and to perform the unlocking operation, since, as soon as this arm is moved from its substantially perpendicular position in which endwise pressure has no tendency to swing up arm 61, it is immediately swung further by the pressure of the press head and thus automatically completes the unlocking or releasing movement.

A modified device for opening the lock between the press plate and the knives at a predetermined point of their working cycle is shown in Fig. 3. Here, the unlocking is dependent upon the degree of the press pressure, for instance by inserting into the press plate 43 a piston like bolt 46 whose head closes an opening in the under side of the press plate. This bolt 46 thus is by the compressed dough pushed upward against the adjustable pressure of a spring 47 as soon as a predetermined pressure of the dough overcomes the counter pressure of the spring 47 which bears against a screw cap 48 in the upper face of press plate 43. Thereby the arm 61' mounted on lock lever pivot 60 and resting on the upper end of bolt 46 is lifted sufficiently to trip the locking device.

The crank and slot drive 11 to 18 with the one directional coupling 14, 15 only controls the forward or working stroke of the press head 43 and knives 44. Their return motion is performed by the opening movement of the upper press form member after the pressing operation, as in existing machines of this type, but the present construction is such that this return motion requires no special adjustment of any kind, being independent of the variation in weight of the rolled dough.

In the machine shown in the accompanying drawings, this motion is produced by a connecting rod 36 attached to a lug 62 on the frame of the machine and so arranged that, on opening of the press head, the press and cutting shaft 13 is turned back to its normal position by means of a swinging arm 37 on shaft 13. By providing one of the members of this drive, such as the connecting rod 36, with a slot 38, the necessary freedom for timing the motion is accomplished. By the return of the press head 43 and of the knives 44 to their normal positions, the locking device 21 between them is automatically reset by means of an adjustable collar 63 on the shank of stop 22, against which the arm 61 rests on the upward motion of the press head. In the modification shown in Fig. 3, the resetting of the lock levers is effected by a stop 22' attached to the housing which turns the arm 61' into locking position as the press head ascends.

The return of the press and cutting drive without special adjustment is accomplished by adjusting the height of the dough rolling space corresponding to the different dough weights differently from the usual method.

In former devices of this kind press head 43 engaged adjustable stops of the cylindrical press housing 27. This arrangement, besides the dependence of the working height upon the quantity of dough present, has the additional disadvantage of greatly limiting the freedom of motion of press plate 43 in cylinder 27, and, since a number of such stops has to be provided, is accompanied by the additional difficulty of adjusting them all to the same height.

In the present invention, the adjustment of the working height, that is of the press plate 43, is performed by attaching the adjustable stops 39, which limit the upward stroke of the press plate 43, to the knife cross 40, Fig. 2. This arrangement makes it possible, upon the withdrawal of the knives 44, to move the same together with press head 43, to any position up to their starting point, which is independent of any adjustment, such, for instance, that the press head 43 always stops at the cover of cylinder 27. It will be observed that the withdrawal movement of the knives is cushioned by the spring 42 mounted on the bolt 41, which is fixed in the upper end of the rack 20', and interposed between the plate 64 loosely mounted on bolt 41 and resting against a shoulder formed in the housing 66, and the upper end of the rack 20'.

Instead of using a stop 39 attached to knife cross 40, the height of the working space of press plate 43 can also be controlled by arranging an adjusting device on any part forming the connection of the press plate 43 with its lifting member, that can be readily set for any length of travel. In Fig. 4, the bolt 41 which holds the resilient stop plate 64 to rack 20' is arranged in this manner by means of a thumb screw 58 by which the position of plate 64 which is pressed against head of bolt 41 by the spring 42 can be adjusted to any desired distance from the stop shoulder 65 of the housing 66. The plate 64 is loosely mounted on the bolt 41 and adjusted thereon by the thumb screw 58 to regulate the tension of the spring 42. When the spring is adjusted in this manner to have a greater tension it will cause the press head 43 to stop at a greater distance below the cylinder cover 27, and thereby increase the height of the dough rolling space.

As previously mentioned, the opening and closing of the press form is performed by a crank 10 of actuating shaft 9. This drive is so arranged that the opening and closing of the machine requires very little time at starting, that is at the end of all working motions, but that during most of the time, namely during pressing, cutting and working, the rotary motion of crank 10 does not affect the mechanism for opening and closing of the machine. Accordingly, the crank 10 or the connecting rod 25 of this mechanism, which actuates the hinge arm 67, is provided with a slot 26 in which the drive pin 24 can idle during a sufficiently large time interval and yet perform its working motion as quickly as possible.

In order to prevent the lower edge of housing cylinder 27 from grinding the dough rolling plate 28 which has a rotary or gyratory movement, upon closing of the press form, the cylinder 27 is supported on the frame of the machine in such manner that either only a very light pressure or else a narrow gap exists between these two parts. In the present machine, the locking hook or latch 29 which prevents the opening of the press form during the working period, is itself designed as a support for the cylinder housing, being so arranged that in its closed position it is locked both against movement in an upward and downward direction.

In operating the hook or latch 29, especially in hand operated machines, it was formerly necessary to move this hook against the closing pressure, whereby the closing manipulation was made considerably more difficult. This disadvantage may in hand operated machines be avoided by so arranging the parts, Fig. 5, that the closing handle 30 of the cylinder can release the hook 29 for opening, but cannot push it back in the opposite direction, because in the latter direction the connection between these two parts is automatically disengaged. For this purpose, the handle 30 is provided with noses 31 which engage with corresponding stop pins 32 of hook 29. The hook 29 is pressed into its closing position by springs 33.

A similar locking device is also required for machines in which all working operations are performed automatically. In order to automatically release the press form closure upon completion of the dough rolling operation in this case, an arm 34 is provided, Fig. 1, which at the desired moment pushes a spring tensioned plunger 35, supported in a suitable stationary guide, against the hook 29, the arm 34 being pivoted on a stud 68 in the pedestal of the machine and turnable by means of a lever 69 having a nose 70 in the path of a striking lug or cam 71 attached in proper timed relation to the face of worm wheel 59 on actuating shaft 9.

Because of its compact arrangement, the entire drive, which is disposed in the upper part of the pedestal of the machine, can be so housed that all its parts run in oil. The gears 4, 5, 59, etc., thus carry along considerable quantities of oil which, by means of channel connections 49, Fig. 2, are collected and carried to the crank bearings and other moving parts, situated above the oil level in the gear housing.

In order to facilitate the opening of the machine after each operation, it is necessary to balance the weight of the swinging press head 27. The counter weights formerly employed for this purpose occupy, together with their lever arms, a comparatively large space and increase the weight of the machine; the lever arms must be journaled and the bearings, which through their friction retard the motion of the pressure head, must be attended to. It is one of the objects of the present invention to overcome these disadvantages by the employment of springs of various kinds. Figs. 6 and 7 show the application of a torsion spring for this purpose. The laminated spring 50 at one end is inserted into a square 51 of the hinge 52, while at the other end it is held by a square hole 53 of the machine frame. In closing the pressure head, the spring 50 is twisted and thereby tensioned, in this manner opposing the weight of the head. This arrangement has the advantage of simplicity, small space requirement, and reliability.

To roll the dough, relative motion between the dividing mechanism and the dough supporting plate takes place. When the dough is inserted, the dividing mechanism must be concentric with the dough plate, otherwise the portions projecting beyond the former will be cut off. The moving part must therefore be returned to a definite starting position before each new cycle, and it is a further object of the present invention to perform this return motion automatically in a simple and efficient manner. For this purpose a weight 54, Fig. 1, is so suspended from the dough rolling shaft 3 that, upon disengaging of the dough rolling drive the weight is in a raised position and drops back by gravity, thereby carrying the rotating part back into a definite starting position.

In place of the aforesaid weight, a spring 55, Fig. 2, may be employed which is fastened to the frame of the machine and acts on a stud 57, eccentrically attached to crank shaft 56 or to drive shaft 3. The spring 55 always tends to occupy its least length and thereby carries the shaft 56 and, with it, the rotating dough rolling plate 28 back into its starting position as soon as its drive is disengaged.

The operation of the improved automatic machine is as follows:

When the dough is inserted and the starting clutch operated, the head of the machine descends by the action of crank 10 and connecting rod 25. Thereupon the knife cross 40 descends by the action of gears 19 and racks 20, taking along the press plate 43 which is held to it by the lock levers 21. The gears 19 are driven by crank 11 and connecting rod 16 and move in one direction only through the action of crank 12 and claw coupling 14, 15. Upon the plate 43 having reached the proper down position in which the dough is compressed to the right consistency for cutting, the levers 21 are unlocked by the tripping arm 61 so that the knife cross 40, now traveling alone, pushes the knives 44 into the compressed dough and divides the same into individual pieces which are then rolled by the movement of the dough plate 28, actuated by the vertical eccentric shafts 7 and 8 started and stopped by means of the mutilated gears 4, 5 driving the gears 6, 6' or any suitable means such as that disclosed in my co-pending application #391,454, Sept. 9, 1929, now Patent No. 1,851,328 granted March 29, 1932. Upon the completion of the rolling motion, the arm 34, actuated by lug 71, pushes plunger 35 against hook 29, thereby releasing the press head of the machine which is then raised by the action of crank 10 and connecting rod 25, the upward motion of the head, through connecting rod 36 and crank 37, turning shaft 13 in the direction opposite to that of crank 12. By this reversal of shaft 13, the gear 19' and rack 20' of the press plate 43 are actuated in the upward direction, the press plate pushing up the knife cross 40 by means of the stops 39. The gear 19' in order that the press plate may be freely operated by the knife plate on its forward or cutting movement thereof is free to rotate on the shaft 13 as the press plate descends. In order that this gear may operate the rack 20 on said reverse movement of the shaft 13, to lift the press plate the gear may be provided with any suitable one way clutch connection (such as the conventional ball clutch) to said shaft 13, as shown in Fig. 4, the gears 19 being provided with similar clutches working only in the opposite direction, as shown in Fig. 1. In another construction the gear 19' may be free to rotate in either direction with respect to the shaft 13, the knife plate 40 being relied on to lift the press plate. As the knife cross ascends, the arm 61, resting against the upper stop 63, gradually turns the levers 21 back into locking position so that the knives are fully locked to the press plate when the latter arrives in its starting position against the cover of housing 27. In the meantime, the weight 54, or the spring 55, has carried the dough plate 28 back into its starting position so that now the machine is ready for a new cycle as soon as the finished rolls have been removed and a new lump of dough has been inserted.

What is claimed is:

1. In a dough dividing and rolling machine, the combination with a press plate and dividing knives for compressing and dividing the dough, of mechanism including a rotatable crank, means for continuously rotating said crank in one direction, and lost motion linkage actuated by said crank for operating said press plate and dividing knives intermittently in predetermined timed relation.

2. In a dough dividing and rolling machine, the combination with a press plate and dividing knives for compressing and dividing the dough, of mechanism including a rotatable crank, means for continuously rotating said crank in one direction, and lost motion linkage actuated by said crank for operating said press plate and dividing knives intermittently in predetermined timed relation, said lost motion linkage including a link having a slot and pin connection for intermittently transmitting motion to said press plate and dividing knives.

3. In a dough dividing and rolling machine, the combination with a press plate and dividing knives for compressing and dividing the dough, of mechanism including a rotatable crank, means for continuously rotating said crank in one direction, and lost motion linkage actuated by said crank for operating said press plate and dividing knives intermittently in predetermined timed relation, said mechanism also including rotatable means for actuating said knives, an oscillating arm driving said rotatable means, and a one way clutch between said arm and said rotatable means.

4. In a dough dividing and rolling machine, the combination with a press plate and dividing knives for compressing and dividing the dough, of mechanism including a rotatable crank, means for continuously rotating said crank in one direction, and lost motion linkage actuated by said crank for operating said press plate and dividing knives intermittently in predetermined timed relation, said mechanism including a lever extending perpendicularly between said plate and knives and operating to move one as a result of movement of the other, and means for swinging said lever out of perpendicular at a predetermined point in their movement to permit one to move thereafter independently of the other.

5. In a dough dividing and rolling machine, the combination with a press plate and dividing knives for compressing and dividing the dough, of mechanism including a rotatable crank, means for continuously rotating said crank, and lost motion linkage for operating said press plate and dividing knives intermittently in predetermined timed relation, said mechanism including a lever extending perpendicularly between said plate and knives and operating to move one as a result of movement of the other, and means for swinging said lever out of perpendicular at a predetermined point in their movement to permit one to move thereafter independently of the other, said lever having a roller at one end providing rolling contact between the lever and one element of said plate and knives whereby slight movement of the lever from perpendicular will result in continued movement of the lever due to approaching movement of the plate and knives.

6. In a dough dividing and rolling machine, the combination with a press plate and dividing knives for compressing and dividing the dough, of mechanism including a rotatable crank, means for continuously rotating said crank in one direction, and lost motion linkage actuated by said crank for operating said press plate and dividing knives intermittently in predetermined timed relation, said mechanism including devices connecting said plates and knives to move one as the result of the operation of the other, and means acting on said device for disconnecting said plate and knives when the pressure of the press plate exceeds a predetermined maximum pressure.

7. In a dough dividing and rolling machine, the combination with a press plate and dividing knives for compressing and dividing the dough, of mechanism including a rotatable crank, means for continuously rotating said crank in one direction, and lost motion linkage actuated by said crank for operating said press plate and dividing knives intermittently in predetermined timed relation, said mechanism including devices forcing the knives towards and into the dough, means for carrying the press plate along with the knives to compress the dough prior to dividing, means for disconnecting the press plate from the knives after the dough has been compressed to permit reverse movement thereof to relieve the pressure on the dough, and adjusting means connected with the dividing knives for limiting said reverse movement of the press plate.

8. In a dough dividing and rolling machine, the combination with a press plate and dividing knives for compressing and dividing the dough, of mechanism including a rotatable crank, means for continuously rotating said crank, and lost motion linkage for operating said press plate and dividing knives intermittently in predetermined timed relation, a hinged frame carrying said plate and said knives, said mechanism including a crank and lost motion linkage for periodically swinging said frame to lift the plate and knives from the dough.

9. In a dough dividing and rolling machine, the combination with a press plate and dividing knives for compressing and dividing the dough, of mechanism including a rotatable crank, means for continuously rotating said crank, and lost motion linkage for operating said press plate and dividing knives intermittently in predetermined timed relation, a rolling table supporting the dough under said knives and press plate, a single drive shaft having three spaced gears under said table, vertical cranks driven from the end gears for operating the rolling table, and a crank shaft for the first mentioned crank operated from said intermediate gear.

10. In a dough dividing and rolling machine, the combination with a dough supporting plate, of a head, dough dividing means in said head, a frame, and hinge means resiliently supporting said head on said frame for movement towards and away from the dough supporting plate and opposing the weight of the head, said hinge means including a laminated spring fixed in said head at one end and in said frame at the other.

11. In a dough dividing and rolling machine, the combination with a dough supporting plate, of a head, dough dividing means in said head, and hinge means resiliently supporting said head for movement towards and away from the dough supporting plate and opposing the weight of the head, said resilient hinge means comprising a laminated torsion spring.

12. In a dough dividing and rolling machine, the combination with a press plate and dividing knives for compressing and dividing the dough, of mechanism including a rotatable crank, means for continuously rotating said crank, and lost motion linkage for operating said press plate and dividing knives intermittently in predetermined timed relation, an intermittently rotating dough supporting and working table cooperating with said plate and said knives and yielding means urging said table to a predetermined starting position to return the same to said position when rotating ceases.

13. In a dough dividing and rolling machine, the combination with a press plate and dividing knives for compressing and dividing the dough, a rotary rolling surface for supporting the dough and a pivoted head supporting said press plate and dividing knives, and means for intermittently lifting said head from the surface including a rotatable drive crank, means for continuously rotating said drive crank in one direction and a slotted link connection between said drive crank and said head.

14. In a dough dividing and rolling machine, the combination with a press plate and a dividing knife supporting plate, of mechanism for intermittently operating said plates in timed relation to compress and divide the dough, and a member on said knife supporting plate acting in one position to cause said plates to move in unison, and means actuated by a predetermined dough pressure for moving said member to inoperative position to release the press plate while permitting further movement of the knife plate, said press plate having an opening in its under side, and said means including a piston head which is yieldingly mounted in said opening to be engaged by the dough.

15. In a dough dividing and rolling machine, the combination with a press plate and a dividing knife supporting plate, of mechanism for intermittently operating said plates in timed relation to compress and divide the dough, and a member on one plate acting in one position to cause said plates to move in unison, and means actuated by a predetermined dough pressure for moving said member to inoperative position to release the press plate while permitting further movement of the knife plate, said means being adjustable to vary the point at which the press plate is released and including a piston head yieldingly mounted in said press plate and adapted to be engaged by the dough.

16. In a dough dividing and rolling machine, the combination with a press plate and a dividing knife supporting plate, of mechanism for intermittently operating said plates in timed relation to compress and divide the dough, and a member on one plate acting in one position to cause said plates to move in unison, and means actuated by a predetermined dough pressure for moving said member to inoperative position to release the press plate while permitting further movement of the knife plate, said means including a piston head exposed to the dough pressure having an actuating connection with said member.

17. In a dough dividing and rolling machine, the combination with a press plate and dividing knives for compressing and dividing the dough, of mechanism including a rotatable crank, means for continuously rotating said crank, and lost motion linkage for operating said press plate and dividing knives intermittently in predetermined timed relation, a rotating working table for supporting the dough, a pivoted head carrying said plate and knives movable towards and away from said table, and a latch for securing said head in one position against further movement towards or away from the table, and means operated by said mechanism for automatically operating said latch to release the head.

18. In a dough dividing and rolling machine, the combination with a press plate and dividing knives for compressing and dividing the dough, of a rotating rolling table for supporting the dough and a head carrying said press plate and dividing knives, movable towards and away from said rolling table, means for intermittently lowering and lifting said head with respect to the table, and means actuated by said lowering and lifting means for locking the head in predetermined position against movement toward or away from said rolling table in the intervals between movement of the head and automatically unlocking said head after a predetermined interval, said lowering and lifting means including a rotatable crank, means for continuously rotating said crank, and a lost motion linkage actuated by said crank for lowering and lifting said head.

19. In a dough dividing and rolling machine, the combination with a press plate and dividing knives for compressing and dividing the dough, of a rotating rolling table for supporting the dough, a head carrying said press plate and dividing knives, movable towards and away from said rolling table, means for intermittently lowering and lifting said head with respect to the table, and means actuated by said lowering and lifting means for locking the head in predetermined position against movement towards or away from said rolling plate in the intervals between movement of the head, said head lifting and lowering means including a crankshaft and operating crank linked to the head.

20. In a dough dividing and rolling machine, the combination with a press plate and dividing knives for compressing and dividing the dough, of mechanism including a rotatable crank, means for continuously rotating said crank in one direction, and lost motion linkage for operating said press plate and dividing knives intermittently in predetermined timed relation, a rolling table below said knives, an enclosed oil housing under said table, a drive shaft carrying said crank in said housing, vertical cranks for operating said rolling table also mounted in said housing, a gear on said crankshaft operating to carry the oil upwards in said housing, and means conducting oil from said gear to the crank parts in the upper portion of said housing.

In testimony whereof, I have signed my name to this specification.

GOTTFRIED RAUSCH.